Oct. 8, 1929.   J. J. CAIN   1,730,721
HANDHOLE COVER
Original Filed Nov. 18, 1919
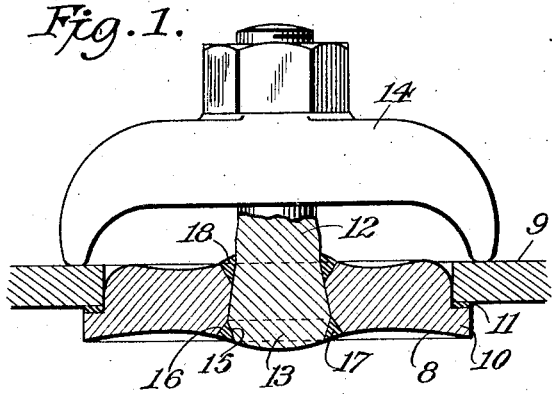
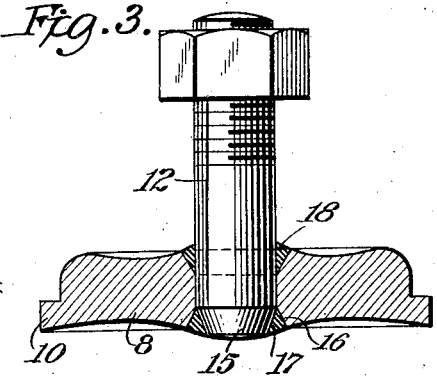
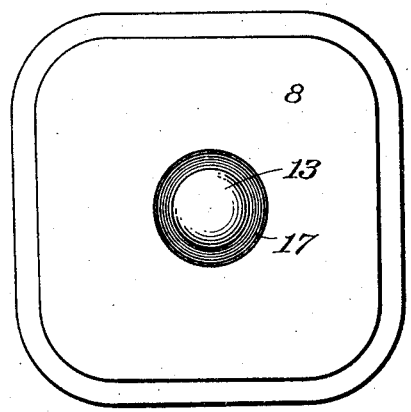
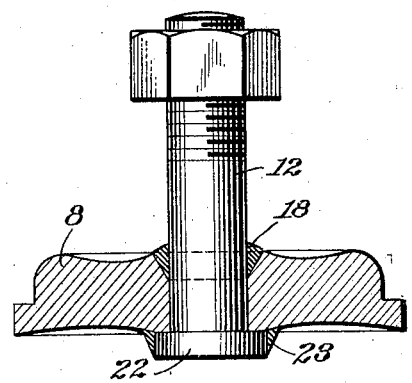
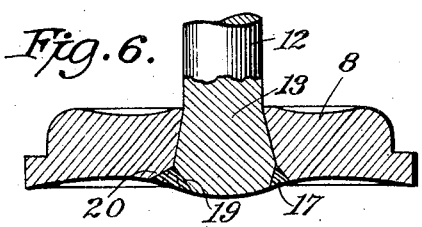
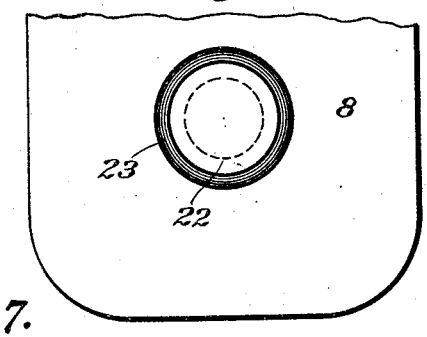
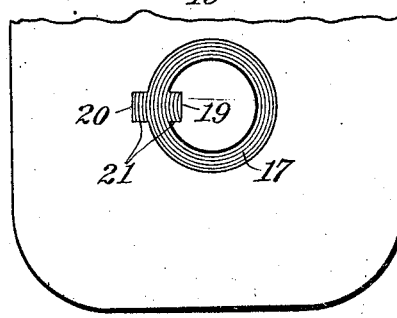
Inventor,
John J. Cain.
By Alfred Shedlock.
Attorney.

Patented Oct. 8, 1929

1,730,721

UNITED STATES PATENT OFFICE

JOHN J. CAIN, OF BAYONNE, NEW JERSEY

HANDHOLE COVER

Application filed November 18, 1919, Serial No. 338,810. Renewed January 25, 1929.

This invention relates to that class of hand hole covers comprising a plate adapted to make a closing joint around the inner edge of a hole in a boiler plate and a bolt extending therefrom, by which the plate is seated and held in position through the medium of an exterior bridge piece. With the plate and bolt made separate and then fastened together, the least expensive method, difficulty is experienced in making the joint between the plate and bolt tight; the general practice being to snugly seat the bolt in a hole in the plate with a collar formed on the bolt resting against one side of the plate and then upsetting the end of the bolt against the other side of the plate. This upsetting or swaging process, by reason of excessive stresses and strains, does not always produce the desired result, and leaks often occur even though, as a preventive measure, caulking of the joints is resorted to. To avoid leaks of this character the plates and bolts have been made integral under a forging process by the use of suitably formed dies, but the expense involved in such manufacture is generally prohibitive.

The object of this invention is to construct hand hole covers composed of plates and bolts that will be inexpensive to make and be tight under all conditions of use; to this end the bolts are seated in the holes in the plates by driving fits, the contacting parts being preferably tapered, one or both of the junctures at the ends of the joints being recessed. To complete the covers and insure that the joints be perfectly tight the sides of the recesses are fused, by electrical or acetylene heat, and a metal adapted to blend or coalesce therewith fused into the recesses.

Illustrations of various applications of this invention, submitted herewith, will now be referred to:

Fig. 1 is a sectional view of a hand hole closure of this invention applied in operative position.

Fig. 2 is a plan view of the hand hole cover.

Fig. 3 is a sectional view showing a modification in the construction of the cover.

Fig. 4 illustrates another modification.

Fig. 5 shows the underside of Fig. 4.

Fig. 6 shows a further modification in the formation of the joint, and

Fig. 7 shows the under side of Fig 6.

The cover plate 8 is shown adapted to close a rectangular opening in a boiler plate 9, it having a flange 10, between which and the inner edge of said opening a suitable packing ring 11 is clamped. The shape of the plate will of course conform to the shape of the opening to be covered; whether round, oval or otherwise. Extending from the plate 8 is a bolt 12, shown in Figs. 3, 4 and 5, as having a cylindrical fit in a hole therein; but to add to its retentiveness its end and the hole in the plate may be made conical or tapered, as shown at 13, Figs, 1, 2, 6 and 7. In all cases it is proposed to so proportion the parts that the bolts will have driving fits in the plates. The plate 8 is held in place by a nut on the bolt 12 bearing against a bridge piece 14, in the usual manner.

To securely hold the bolt in the plate and positively seal the joint between them a welding process is employed involving the use of a connecting metal. A recess or groove is made around the joint by chamfers formed at the end of the bolt and the inner end of the hole in the plate, as shown respectively at 15 and 16, Figs. 1, 3 and 6. The joint may now be sealed tight against all conditions of use by fusing the surfaces of the recess, by electrical heat or heat of acetylene, and at the same time fusing or melting into the recess a metal adapted to blend or coalesce with the metal of the bolt and plate, as indicated at 17.

This end welded seal should in most cases be sufficient to insure tight joints between the bolts and plates; it may however be desirable, as an extra security, to form recesses at the outer ends of the joints and weld the binding metal therein, as indicated at 18, Figs. 1, 3 and 4. These welded seals 18 will also greatly assist in holding the bolts and plates to resist any thoughtless or accidental blows against the ends of the bolts. Furthermore, with the parts constructed to prevent relative rotation between the hand hole plate and the boiler plate as illustrated, the weld between the bolt and the hand hole plate prevents the relative rotation between the two which tends to occur under the torsional strains resulting from setting up the bolt.

Connecting joints of this character between plates and bolts are sometimes submitted to even more severe torsional strains tending to tear the junctures of the recesses and the binding metal apart; for instance such strains may be due to the nuts becoming so bound on the bolts, by rust etc., as to require great force to turn them. To guard against any such contingency it is proposed to provide keys or locking means integral with the binding metal, as illustrated in Figs. 6 and 7. Grooves or key-ways 19 and 20 are formed in the end of the bolt 12 and plate 8 respectively laterally extending from the recess and into which the binding metal 17 will be fused when it is applied to the recess; thus a key 21, solid with the metal 17, adapted to resist all torsional strains, is applied to the joint. Obviously, similar results could be secured by making the recess between the bolt and the plate of non-circular contour other than that specifically shown in Fig. 7.

The bolt 12 may be provided with a head 22, as shown at Figs. 4 and 5, which bears against the under side of the plate 8, and the binding joint sealing metal be fused into the edge of the bolt head and into the surrounding surface of the plate, in manner before described, as indicated at 23.

I claim:

1. A hand hole cover, comprising a plate, a bolt having a tapered end seated in a correspondingly shaped hole formed through the plate, a recess formed around the juncture of the joint at the end of the bolt, grooves extending laterally from the recess into the plate and bolt and a metal adapted to blend with the plate and bolt fused into the recess and the lateral grooves.

2. Means for securing together a plate and a bolt seated in a hole therein, which consists of a recess formed at the juncture of the joint between the plate and bolt and key ways laterally formed from said recess and a metal adapted to blend with the plate and bolt fused integral into the recess and the lateral key ways 3. A hand hole cover comprising a plate provided with a hole, a bolt seated in said hole, a recess being formed at the juncture of the joint between the plate and bolt and having a non-circular contour, and a metal adapted to blend with the plate and the bolt fused integral into said recess whereby the metal in said recess serves as a key to prevent turning of the bolt with respect to the plate.

4. A hand hole cover comprising a plate provided with a hole, a bolt seated in said hole, a recess being formed at the juncture of the joint between the plate and bolt, and a metal adapted to blend with the plate and the bolt fused integral into said recess, said recess having a non-circular contour on the side adjacent to the bolt whereby the metal in said recess serves as a key to prevent turning of the bolt with respect to the plate.

5. A hand hole cover comprising a plate provided with a hole, a bolt seated in said hole, said bolt and said hole being tapered throughout their engaging portions, a recess being formed at the juncture of the joint between the plate and the bolt, and a metal adapted to blend with the plate and the bolt fused integral into said recess.

6. A hand hole cover comprising a plate provided with a hole, a bolt seated in said hole, said bolt and said hole being tapered throughout their engaging portions, a recess being formed at the juncture of the joint between the plate and the bolt, and a metal adapted to blend with the plate and the bolt fused integral into said recess, said recess being non-circular in contour whereby the metal in said recess serves as a key to prevent turning of the bolt with respect to the plate.

Signed at New York, county and State of New York, this 14th day of November, 1919.

JOHN J. CAIN.